United States Patent [19]

Will et al.

[11] 4,253,348

[45] Mar. 3, 1981

[54] SAFETY CIRCUIT FOR ELECTRONICALLY CONTROLLED AUTOMATIC VEHICLE TRANSMISSION

[75] Inventors: Gerhard Will, Steinheim; Walter Stroh, Sachsenheim, both of Fed. Rep. of Germany

[73] Assignee: Robert Bosch GmbH, Stuttgart, Fed. Rep. of Germany

[21] Appl. No.: 864,488

[22] Filed: Dec. 27, 1977

[30] Foreign Application Priority Data

Jan. 7, 1977 [DE] Fed. Rep. of Germany ....... 2700548

[51] Int. Cl.³ ............................................. B60K 41/10
[52] U.S. Cl. ................................................... 74/866
[58] Field of Search ...................... 74/866, 752 D, 871

[56] References Cited

U.S. PATENT DOCUMENTS

| | | | |
|---|---|---|---|
| 3,628,642 | 12/1971 | Ravenel | 74/866 X |
| 3,665,779 | 5/1972 | Mori | 74/866 |
| 3,682,014 | 8/1972 | Magg et al. | 74/866 X |
| 3,721,136 | 3/1973 | Irie | 74/752 D X |
| 3,776,048 | 12/1973 | Enomoto et al. | 74/866 |
| 4,041,809 | 8/1977 | Dick et al. | 74/866 |

FOREIGN PATENT DOCUMENTS 2447860 4/1976 Fed. Rep. of Germany ............. 74/866

*Primary Examiner*—Rodney H. Bonck
*Attorney, Agent, or Firm*—Frishauf, Holtz, Goodman & Woodward

[57] ABSTRACT

A comparator circuit compares an engine speed signal with an engine load signal, the latter being furnished to the comparator through transistors controlled by switching signals representative of the condition of the gear range selection lever, the kickdown switch and the magnetic valve that operates, when actuated, to shift from high gear to a lower gear. The circuit is operative only when the kickdown switch is unoperated and the gear range selection lever is in the "drive" position that permits operation in high gear. The magnetic valve position indication is coupled to the circuit through a differentiating network, so that the circuit comes into play only for a short interval following the switching over of the magnetic valve from the high gear position. If at that time the ratio of engine speed to engine load, instead of being consistent with the automatic transmission shift program, is in the range where a downshift would involve risk to the safety of the vehicle, the circuit operates to cut off the current supply to the magnetic valve, forcing it to return into the high gear condition. Operation of the magnetic valve as the result of a failure of a component in the electronic control of the transmission or some other accidental disturbance is thereby prevented from endangering the vehicle.

5 Claims, 5 Drawing Figures

SAFETY CIRCUIT FOR ELECTRONICALLY CONTROLLED AUTOMATIC VEHICLE TRANSMISSION

This invention relates to a safety circuit for an electronic control system of a vehicular automatic transmission for preventing some disturbance or malfunction of the system from shifting the transmission down from a high gear to a lower gear when engine speed and engine loading have a ratio within a certain range.

In motor vehicles equipped with electronically controlled automatic transmissions magnetic valves are operated for setting the transmission into the particular gear determined to be appropriate by the electronic control system depending upon various factors in combination, including the respective positions of the gear-range selector lever, the engine throttle, the kickdown switch and the rate of rotation the output shaft of the transmission. The switchover points from one gear to another as they depend upon the throttle position and the rotational speed of the vehicle drive shaft on the output side of the transmission, are conventionally represented by a graphical switching program that makes clearly visible the limits for upshifting and for downshifting. Furthermore, from such a graphical representation of the shifting logic or program, the relations between the pressing down of the accelerator pedal and the actuation of the kickdown switch at the end of the pedal stroke can be observed.

A disadvantage of the above described electronic transmission control is that in the event of an unprogrammed operation of the magnetic valves controlling the downshifting from a high gear to a low gear, as a result of disturbances occurring or taking effect in the vehicle, particularly in the electronic transmission control system, an undesired and generally intolerable downshift into a low gear results. It is, of course, known to equip vehicles with a guard against unintended putting into reverse during forward travel, and to provide the lowest gear of the transmission with an overrunning coupling so that in the case of an unintended shift from the lowest forward gear into reverse, the vehicle rolls on. Dangerous situations can also occur, however, in other cases, particularly if, while the vehicle is moving at high velocity and under light load, a downshift from the highest into the next forward gear is produced as a result of a disturbance or malfunction in the vehicle equipment. the vehicle would then be exposed, while going at high speed, to a strong braking effect by having suddenly to pull up the motor to a much higher speed, which effect can lead to accidents, particularly in the case of bad road conditions, on curves and in the presence of icing.

THE PRESENT INVENTION

It is an object of the present invention to provide a safetly circuit that assures that a downshift from a high gear into a low gear will not take place when the ratio of engine speed and engine loading is within a predetermined range and, further, to take into account, in the design and operation of the safety circuit, whether the kickdown switch is operated or not.

Briefly, the outputs of transducers producing signals respectively representative of engine loading and engine speed are supplied, along with signals indicating the position of at least one magnetic valve controlling the shifting of the transmission from a high gear to a lower gear, to a comparison stage which operates a switching means when a change of position of the magnetic valve away from high gear occurs while the outputs of the transducers are within a predetermined range of relative ratio to each other. The switching means then apply voltage to the magnetic valve corresponding to and imposing the high gear position of the valve. Preferably the voltage applied by the switching means to the valve corresponding to and imposing the high gear position is a zero voltage.

In a particular and advantageous form of the invention, the comparison stage includes a comparator with a first input connected to the engine speed transducer and a second input connected through a series combination of the switching paths of at least two transistors with the engine loading transducer, the bases of two of these transistors being supplied with voltages respectively corresponding to the position of the gear range selector lever and the position of the magnetic valve controlling the downshifting. Preferably a third transistor is included in the series connection of switching paths of transistors and the base of the third transistor receives a voltage corresponding to the position of the kickdown switch.

It is furthermore advantageous to supply the voltage corresponding to the switching position of the magnetic valve to the transistor chain through a highpass circuit, as further explained below.

The safety circuit according to the invention has the advantage that during operation of the motor vehicle permitting a high speed of travel, the switching condition, which is to say the position, of the magnetic valve controlling downshifting from a high gear into a low gear is assured of effective monitoring with reference to the engine speed, the engine loading and the position of the kickdown switch. In this manner it is assured that the safety circuit responds only within a range of conditions in which downshift from a high to a low gear could lead to endangering the vehicle.

DRAWINGS ILLUSTRATING AN EXAMPLE

In the annexed drawings there are shown a switching program for explanation of the safety circuit of the invention, basic diagrams of embodiments of the safety circuit and two graphs showing the course of voltages at particular points in an embodiment of the safety circuit, with reference to which the invention is further explained.

Figure 1:
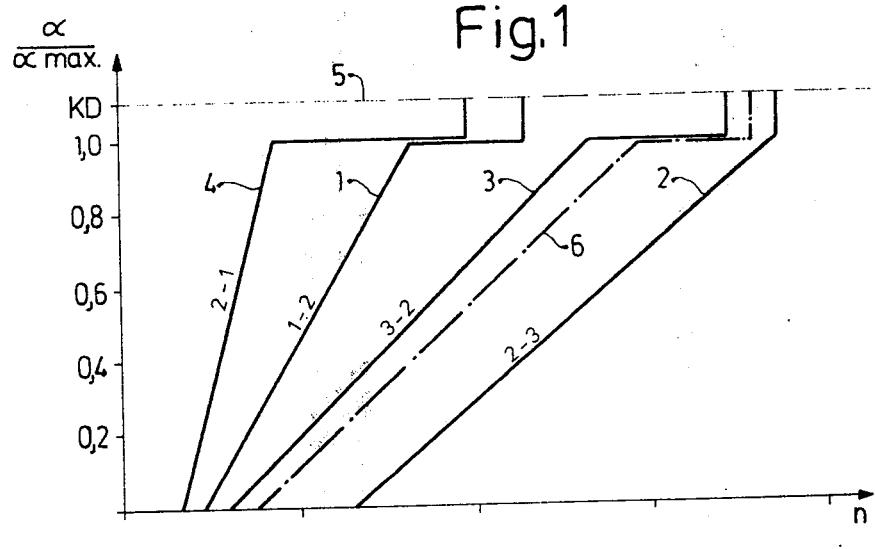
FIG. 1 is a shift program graph for a three speed transmission in terms of the throttle position $\alpha$ and the rotary speed of the transmission output drive shaft n.

FIG. 1 shows the conventional graphical representation of a shift program for an automatic 3-speed transmission. From this diagram can be found at what relation of throttle position $\alpha$ and transmission output shaft speed n a shift of gears will take place. Thus the first upshift boundary 1 designates the shifting up from first into second gear, the second upshift boundary 2 the shifting up from second into third gear, the first downshift boundary 3 the shifting down from third into second gear and the second downshift boundary 4 the shifting down from second into first gear. The number of gears automatically shifted can be selected by the driver by a selector lever: for example, the position "1" of the lever permits only operation in first gear, the position "2" of the lever allows operation in first and second gear only, with automatic shifting between them and the position "D" of the lever allows operation in all three gears. This means that only with the selector lever in position "D" can the operation of the vehicle extend over the whole region of the diagram given in FIG. 1. Furthermore, the driver has the possibility of actuating a kickdown switch by pushing down the accelerator pedal all the way. By this operation a maximum permissible speed in a lower gear is available over the boundary shown in FIG. 1 down to the kickdown-boundary 5. In this manner an acceleration of the motor in the next lower speed can be produced, even if according to the switching boundaries of FIG. 1 the next higher gear would have to be used. This can, of course, be a desired driving condition, for example, if an increased torque is needed briefly for overtaking another vehicle.

The shifting from one gear to another according to the program represented in FIG. 1 is controlled by magnetic valves which are connected to an electronic control circuit. In the illustrated example of a three-speed transmission, for example, two magnetic valves are necessary for the purpose, the shifting of the first gear being accomplished by one magnetic valve and the shifting of the second gear by the second magnetic valve. If both magnetic valves have no control current, the third gear is put in operation.

It can happen, as a result of disturbances in the electronic transmission control, that the magnetic valve for shifting into second gear is actuated and that thereby a lower gear is put into operation. In this connection, a shift into first gear caused by a disturbance can be left out of consideration, since the first gear as a rule has an overrunning coupling and the vehicle rolls on ahead if a disturbance causes a shift into first gear, and there is no sharp braking. If the vehicle is operating at high transmission output shaft speed, i.e. high travel velocity, and under light load in third (high) gear, and then as the result of a disturbance the second gear magnetic valve operates, however, an undesired downshift into second gear takes place, with a strong braking effect on the vehicle.

In normal vehicle operation, the magnetic valve for shifting into second gear is excited and operated only when the first downshift boundary of FIG. 1 is reached. The safety circuit of the present invention accordingly defines a safety boundary 6 that is displaced somewhat in transmission output shaft speed compared to the first downshift boundary 3. If now the magnetic valve that serves to shift into second gear is actuated in the region of FIG. 1 beyond the safety boundary 6, the safety circuit of the present invention recognizes that a disturbance in the electronic transmission control is present and switches the magnetic valve off. In consequence, the vehicle remains in third speed and a downshift and consequent dangerous braking of the vehicle cannot come about.

Figure 2:
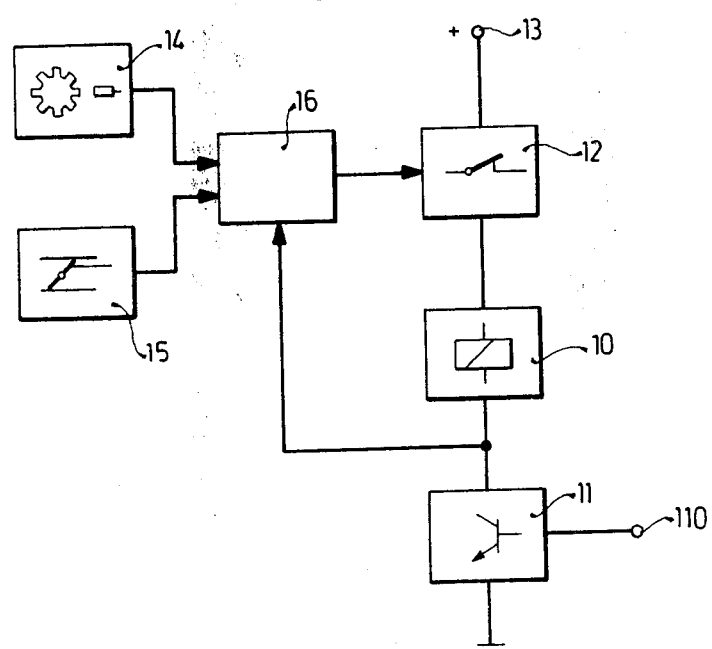
FIG. 2 is a block diagram of an embodiment of the safety circuit.

FIG. 2 shows the block diagram of an embodiment of the safety circuit of the invention. An engine speed transducer 14, typically a tachogenerator in the form of an inductive element repeatedly excited by the teeth of a gear wheel mounted, for instance, on the engine crankshaft is coupled to one input of a comparison stage 16, while another input is coupled to an engine load transducer 15, for example a device producing a signal proportional to and mechanically coupled to the throttle of the engine. The comparison stage 16 is operatively connected with switching means 12 that are interposed in the supply connection of the magnetic valve 10 that serves to put the transmission into second gear. The positive voltage supply line leads from a terminal 13 that is connected to the positive voltage supply of the vehicle electrical system, over the switching means 12, through the magnetic valve 10 and a switching transistor 11 to ground (vehicle chassis). The common connection of the magnetic valve and the switching transistor 11 is connected to an input of the comparison stage 16. The switching transistor 11 has a control input 110. During normal operation of the vehicle, the switching means 12 are closed and the magnetic valve 10 can be operated in dependence on the positions of the gear-range selector lever, the engine throttle and the kickdown switch and also the transmission output shaft speed in accordance with the program illustrated in FIG. 1. For this purpose, the switching transistor 11 is either switched on (made conducting) or off (made non-conducting) by means of its control input 110. If the transistor 11 conducts, the magnetic valve 10 is excited, and if the transistor 11 is nonconducting, the magnetic valve 10 is without current. At the common connection of the switching transistor 11 and the magnetic valve 10, there is accordingly a voltage that is equal to the supply voltage if the magnetic valve 10 is without current. If the switching transistor 11 is made conducting, whether through an intended signal at its control input 110 or whether by a disturbance or a failure of the switching transistor 11 in the nature of a short-circuit, the common connection of the switching transistor 11 and the magnetic valve 10 is at chassis ground potential. If now it is determined in the comparison stage 16 that the relationship of motor speed and motor load condition lies in a region of the diagram of FIG. 1 in which a downshift into second gear is not permissible and if the collector side of the switching transistor 11 is grounded, the switching means 12 are actuated and the current supply of the magnetic valve 10 is thereby interrupted.

Figure 3:
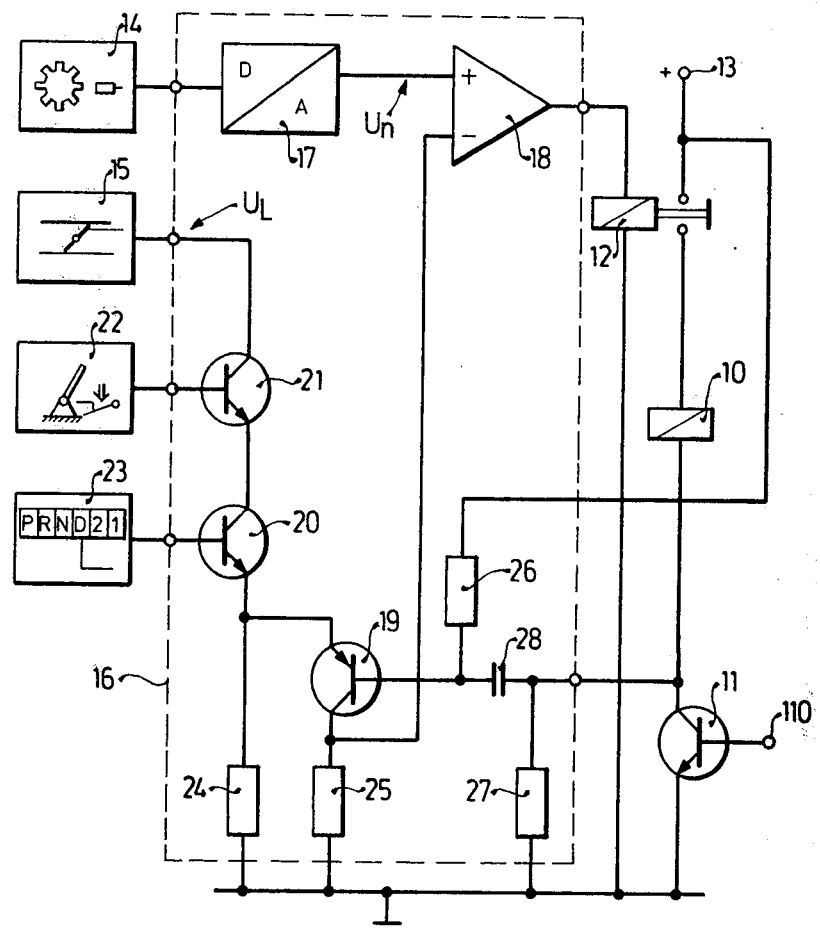
FIG. 3 is a basic circuit diagram of an embodiment of the safety circuit.

FIG. 3 shows the basic current diagram of an embodiment of the safety circuits according to the invention. The comparison stage 16 receives input signals from the rotary speed transducer 14, the engine load transducer 15, a kickdown switch 22, a transmission range selector lever 23 and the collector side of the switching transistor 11. The comparison stage 16 operates the switching means 12, here represented by a normally open relay that closes or interrupts the current supply connection between the magnetic valve 10 and the terminal 13 that is connected to the operating voltage. The speed transducer 14 is connected to a digital-to-analog converter 17, the output of which is connected to the first and noninverting input of a comparator 18. The voltage at the output of the digital-to-analog converter 17 is designated $U_n$. The second and inverting input of the comparator 18 is connected through a respective switching path of the first transistor 19, a second transistor 20 and a third transistor 21 with the engine load transducer 15. The output voltage of the engine load transducer 15 is designated $U_L$.

The base of the second transistor 20 is connected to the transmission range selector lever 23, the base of the third transistor 21 to the kickdown switch 22, in each case in such a way as to provide a control voltage representative of the position of the device in question. The collector of the first transistor 19 is connected to ground through a resistor 25 and the emitter of the second transistor 20 is connected to ground through a resistor 24. The base of the first transistor 19 is connected through a capacitor 28 with the collector of the switching transistor 11 and through a resistor 26 with the positive voltage supply. The collector of the switching transistor 11 is connected to chassis ground through a resistor 27.

Figure 4:
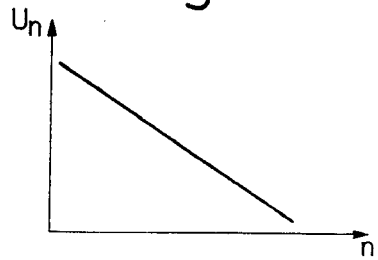
FIG. 4 is a graph of the course of the voltage as a function of the engine speed at a first point in the circuit of FIG. 3.
Figure 5:
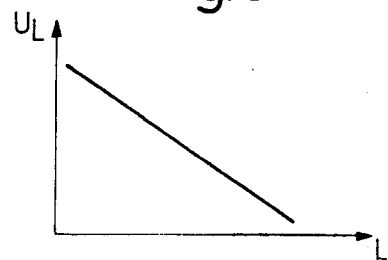
FIG. 5 is a graph of the course of the voltage at a second point of the circuit of FIG. 3 as a function of the engine loading.

In FIG. 4, the output voltage $U_n$ of the digital-to-analog converter 17 is represented in relation to the motor speed n. From the characteristic curve or line showing this dependence, it can be seen that the voltage $U_n$ has a high value at low motor speeds and falls off at high motor speeds. In FIG. 5, the output voltage of the engine load transducer 15 is represented. As can be seen from the characteristic curve or line, the output voltage is high at low load and falls off with higher load.

The switching means 12 serves to switch on and off the current supply of the magnetic valve 10 and are closed when the comparator 18 is in its positive switching condition. This is the case when the voltage at the non-inverting input of the comparator 18 takes on a high value. As can be seen from FIG. 4, this is the case for low motor speeds. At high motor speeds, the voltage $U_n$ falls off and finally reaches a value at which the comparator 18 flops over from its positive switching condition into the switching condition 0. The relay used for the switching means 12 then drops out and interrupts the current supply of the magnetic valve 10. In this manner, the comparison circuit 16 operates as an overspeed protection circuit for the motor.

In normal driving operation, the first transistor 19 is blocked and the voltage 0 is present at the inverting input of the comparator 18. Only upon a switch on operation of the magnetic valve 10 by the transistor 11 a downward voltage jump at the collector of the switching transistor 11 be transmitted through the differentiating circuit consisting of the resistances 26 and 27 and the capacitor 28 to the base of the first transistor 19 which thereupon goes into its conducting condition. Provided that the second transistor 20 and the third transistor 21 are conducting, there is now applied the output voltage $U_L$ of the load condition transducer 15 to the inverting input of the comparator 18. The second transistor 20 is conducting if the transmission range selector lever 23 is in the position "D" and the third transistor 21 is conducting if the kickdown switch 22 is not operated. This means that the safety circuit undertakes the comparison of the values of the engine speed and of the engine load condition only if the automatic transmission is operated in the D-position of the control lever and no kickdown operation is present. If the transistors 19, 20 and 21 are all conducting, the inverting input of the comparator 18 receives the application of a high potential if the engine is driven at low load and the voltage is reduced if the load increases. The combination of the two voltage values for speed and load at the inputs of the comparator 18 corresponds to the determination of a range for the ratio of these two values in which the safety circuit should respond.

The switchover signal of the magnetic valve 10 is coupled dynamically to the base of the first transistor 19 in order to obtain a distinction from a transmission condition of operation in second gear. In the D setting of the automatic transmission, the range of ratios of engine speed to engine load values in which the safety circuit takes effect can arise during operation in second gear, just as well as in third gear operation. If the transmission is in second gear, however, and the switching transistor 11 is consequently conducting, while the ratio of engine speed and engine load value reaches the predetermined range, the safety circuits would respond if the position of the magnetic valve 10 were coupled statically, rather than dynamically to the base of the first transistor 19, i.e. the voltage 0 would be constantly applied and the transistor 19 would constantly conduct. It is therefore assured by the capacitive coupling that only changes of condition during operation in third gear will make possible a response of the safety circuit.

The third transistor 21 is conducting only when the kickdown switch is not operated. This means that the effect of the load condition on the safety circuit is put out of action if the vehicle is put into kickdown operation. As is evident from the diagram of FIG. 1, this is necessary, because the safety circuit would respond, if in a certain operation condition in third gear above the boundary of the maximum throttle position value, a command for kickdown operation should take place and the transmission were thereby intended to go into second gear. For this reason, the portion of the safety circuit influenced by load condition is put out of operation by actuation of the kickdown switch 22 in order to make the desired driving condition possible.

Although the invention has been described with reference to a particular illustrative example, it will be recognized that variations and modifications are possible within the inventive concept.

Thus, for example, it makes no difference in the illustrated example whether the speed transducer 14 operates off the engine crankshaft or off the output drive shaft of the transmission, since the only time that its output is taken into account the vehicle is operating in high gear. At the particular times of interest for the measurement made by the speed transducer 14, there is a predetermined ratio between the rate of revolution of the engine crankshaft and the rate of revolution of the drive shaft on the output side of the transmission. For the purposes of the invention, a transducer mounted on either of these rotating shafts would produce a signal representative of engine speed.

We claim:

1. A safety circuit for an electronic control system of a vehicular automatic transmission that has at least one magnetic valve controlling the shifting of the transmission from a high gear to a lower gear, is driven by an engine of a vehicle, and is equipped with engine loading and engine speed transducers respectively for producing electrical signals representative of engine loading and engine speed, said safety circuit further comprising the improvement which consists in that:

a comparison stage (16,18) is provided, having a first input connected to said engine speed transducer and a second input connected in series with at least one enabling switch to the output of said engine loading transducer, and having a connection to means for indicating the position of said magnetic valve (10), and switching means (12) are connected to the output of said comparison stage, said means for indicating the position of said magnetic valve being so coupled (27,28) to said at least one enabling switch (19) so as to enable said comparison stage to switch over said switching means (12) in response to relative magnitude comparison of the outputs of both said transducers only during a short period of predetermined duration that substantially immediately follows a change of position of said magnetic valve (10) away from high gear, and said switching means (12) are so connected that when they are switched over as aforesaid by said comparison stage (16,18) they apply voltage to said magnetic valve (10) corresponding to and imposing the high gear position of said valve.

2. A safety circuit as defined in claim 1 in which said voltage applied by said switching means (12) corresponding to and imposing the high gear position of said valve is 0 voltage.

3. A safety circuit for an electronic control system of a vehicular automatic transmission that has at least one magnetic valve controlling the shifting of the transmission from a high gear to a lower gear, is driven by an engine of a vehicle, and is equipped with transducers for producing electrical signals representative of engine loading and engine speed, said safety circuit further comprising the improvement which consists in that:

a comparison stage (16) is provided which includes a comparator (18) having a first input connected to the output of that one (14) of said transducers (14,15) that produces electrical signals representative of engine speed and having a second input connected, through a series combination of the switching paths of at least two transistors (19,20), with the output of that one (15) of said transducers that produces signals representative of engine loading, the bases of said transistors (19,20) being supplied with voltages respectively corresponding to the position of a gear range selector lever (23) and corresponding to the position of said magnetic valve (10);

switching means (12) are connected to the output of said comparator (18) for operation of said switching means (12) when a change of position of said magnetic valve (10) away from high gear occurs while said outputs of said transistors are within a predetermined range of ratio to each other, and said switching means (12) are so connected that when they are operated as aforesaid by said comparator stage (16) they apply voltage to said magnetic valve (10) corresponding to and imposing the high gear position of said valve.

4. A safety circuit as defined in claim 3 in which said automatic transmission control system includes a kickdown switch and in which said series connection of the switching paths of at least two transistors (19, 20) also includes the switching path of a third transistor (21) having a voltage applied to its base corresponding to the position of said kickdown switch.

5. A safety circuit as defined in claim 4 in which said voltage corresponding to the switching condition of said magnetic valve (10) is supplied to the base of said transistor (19), which is responsive thereto, through a high-pass circuit.

* * * * *